(12) United States Patent
Dinulescu et al.

(10) Patent No.: US 8,942,186 B2
(45) Date of Patent: Jan. 27, 2015

(54) TRANSMISSION AND RECEPTION CHANNEL SELECTION FOR COMMUNICATING BETWEEN A TRANSMITTER UNIT AND A RECEIVER UNIT

(75) Inventors: Ionut-Gabriel Dinulescu, Craiova (RO); Bogdan Hobinca, Iasi (RO); Mitsunobu Matsuka, Nakanoku (JP); Koichi Matsuo, Yokohama (JP); Nicusor Penisoara, Bucuresti (RO)

(73) Assignee: Freescale Semiconductor, Inc., Austin, TX (US)

( * ) Notice: Subject to any disclaimer, the term of this patent is extended or adjusted under 35 U.S.C. 154(b) by 862 days.

(21) Appl. No.: 12/518,845

(22) PCT Filed: Dec. 14, 2006

(86) PCT No.: PCT/IB2006/054867
§ 371 (c)(1),
(2), (4) Date: Jun. 11, 2009

(87) PCT Pub. No.: WO2008/072035
PCT Pub. Date: Jun. 19, 2008

(65) Prior Publication Data
US 2010/0027493 A1    Feb. 4, 2010

(51) Int. Cl.
*H04W 4/00* (2009.01)
*H04W 72/02* (2009.01)
*H04W 72/08* (2009.01)

(52) U.S. Cl.
CPC ............ *H04W 72/02* (2013.01); *H04W 72/085* (2013.01)
USPC ......................................... 370/329

(58) Field of Classification Search
CPC ................................................ H04L 2012/6456
USPC ......... 370/310, 315, 319, 322, 329, 330, 341, 370/348, 431, 443, 463; 709/225, 226, 250
See application file for complete search history.

(56) References Cited

U.S. PATENT DOCUMENTS 5,689,439 A * 11/1997 Weerackody et al. ........ 370/329
5,711,001 A    1/1998 Bussan et al.
(Continued)

FOREIGN PATENT DOCUMENTS

| GB | 2415568 A | 12/2005 |
|---|---|---|
| JP | 2002330142 | 11/2002 |
| WO | 2005069800 A2 | 8/2005 |

OTHER PUBLICATIONS

"Performance study of IEEE 802.15.4 using measurements and simulations"; IEEE Wireless Communications and Networking Conference, 2006. WCNC 2006. vol. 1, Apr. 3-6, 2006 pp. 487-492.
(Continued)

*Primary Examiner* — Jeffrey M Rutkowski

(57) ABSTRACT

A data communication network. The network includes a transmitter unit for transmitting data and a receiver unit for receiving data from the transmitter unit. The network has two or more data channels via which data may be transmitted by the transmitter unit to the receiver unit. The receiver unit includes a receiver channel selection unit for selecting a reception channel from the at least two data channels. The receiver channel selection unit operates independent from a selection of a transmission channel by a transmission channel selection unit in the transmitter unit. The transmission channel selection unit is arranged to select a transmission channel from the at least two data channels to transmit data to the receiver unit.

20 Claims, 3 Drawing Sheets

(56) References Cited

U.S. PATENT DOCUMENTS

| | | | |
|---|---|---|---|
| 5,940,436 A * | 8/1999 | Huloux | 370/431 |
| 5,943,340 A * | 8/1999 | Iemura | 370/431 |
| 5,961,603 A * | 10/1999 | Kunkel et al. | 709/225 |
| 6,226,520 B1 * | 5/2001 | Jeoung | 455/452.2 |
| 7,027,418 B2 * | 4/2006 | Gan et al. | 370/329 |
| 7,693,542 B2 * | 4/2010 | Mauney et al. | 455/552.1 |
| 2002/0039380 A1 | 4/2002 | Steed et al. | |
| 2003/0093529 A1 * | 5/2003 | Simpson et al. | 709/226 |
| 2003/0151697 A1 | 8/2003 | Lim | |
| 2004/0080213 A1 | 4/2004 | Chang | |
| 2004/0157555 A1 | 8/2004 | Richenstein et al. | |
| 2005/0159107 A1 * | 7/2005 | Mauney et al. | 455/41.2 |
| 2005/0190784 A1 * | 9/2005 | Stine | 370/310 |
| 2006/0045107 A1 * | 3/2006 | Kucenas et al. | 370/310 |
| 2006/0077928 A1 | 4/2006 | Amano | |
| 2009/0232023 A1 * | 9/2009 | Soffer et al. | 370/254 |

OTHER PUBLICATIONS

Zhou et al; "Crowded Spectrum in Wireless Sensor Networks"; University of Virginia.

International Search Report fro coordinating PCT Application No. PCT/IB06/54867 completed on Aug. 27, 2007.

\* cited by examiner

TRANSMISSION AND RECEPTION CHANNEL SELECTION FOR COMMUNICATING BETWEEN A TRANSMITTER UNIT AND A RECEIVER UNIT

FIELD OF THE INVENTION

This invention relates to a data communication network, a transmitter unit, a receiver unit, a kit of parts, a method for transmitting data and a computer program product.

BACKGROUND OF THE INVENTION

Data communication networks are generally known and commonly used, for example to connect computers to each other. However, with the increase of the number of networks, obtaining a sufficient connection between two devices in the network becomes increasingly difficult. For instance in wireless networks, interference by sources of electromagnetic radiation may hamper the transmission of data. For instance, in case the data communication network is a wireless communication network and the data channels are wireless channels at a frequency of about 2.4 GHz, interference is likely from microwave ovens, Bluetooth links or other wireless transmission systems that operate in the frequency band of about 2.4 GHz. Accordingly, there is a chance that a data channel cannot be used or that data transmitter by a transmitter unit will not (correctly) be received by a receiver unit.

It is known from data communication networks compliant with the ZigBee standard to prevent a loss of data by outputting signals modulated with a direct-sequence spread-spectrum (DSSS) modulation technique to reduce the effect of interference on the transmitted data. However, one disadvantage thereof is that, in case a large number of devices is configured to use the same channel, there is still the risk that not all of the devices will have the chance of using the channel due to the limited capacity of the channel.

SUMMARY OF THE INVENTION

The present invention provides a data communication network, a transmitter unit, a receiver unit, a kit of parts, a method for transmitting data and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
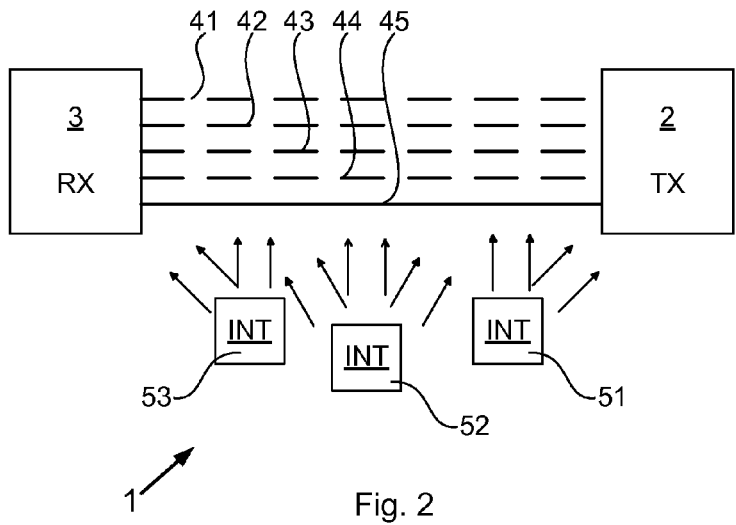
FIG. 1 shows a block diagram of an example of an embodiment of a data communication system.

Referring to FIG. 1 an example of a data communication network 1 is shown. The data communication network 1 may include a transmitter unit (TX) 2 and a receiver unit (RX) 3. In the example, for sake of simplicity, only one transmitter unit 2 and one receiver unit 3 are shown, however it will be apparent that the data communication network 1 may include two or more transmitter units and/or two or more receiver units.

The data communication network 1 further may include two or more data channels 41-45 (in FIG. 1 five data channels are shown, however it will be apparent that the data communication network 1 may include more or less data channels). The data channels 41-45 may connect the transmitter unit 2 to the receiver unit 3. The data channels 41-45 may for example be wireless communication channels. The data channels 41-45 may for example differ in frequency and/or modulation scheme and/or coding scheme and/or any other manner suitable to distinguish data channels from each other.

Figure 2:
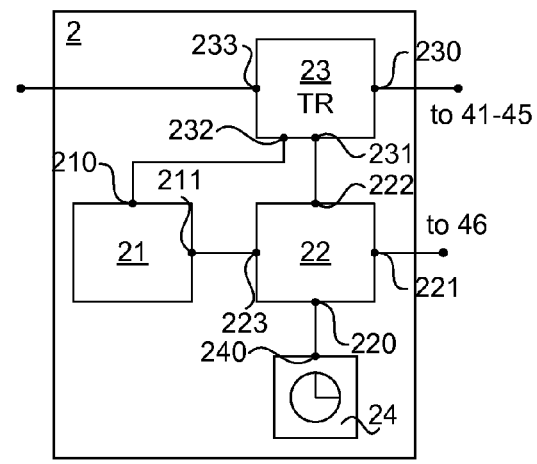
FIG. 2 shows a block diagram of an example of an embodiment of a receiver unit.

As shown in FIG. 2 in more detail, the transmitter unit 2 may transmit data to the receiver unit 3 via one or more of the data channels 41-45. The receiver unit 3 may be able to receive data from the transmitter unit 2 via one or more of the data channels. However, as shown in FIG. 1, in addition to the transmitter unit 2, one or more other, interfering, signal sources (INT) 51-53 may be present in the environment of the data communication network 1. The other sources 51-53 may transmit signals which at least partially affect the transmission of data through the data channel 41-45, for example by emitting radiation which has frequency components interfering with the frequency of one or more of the data channels 41-45.

The transmitter unit 2 may, as for instance shown in FIG. 2, include a transmission channel selection unit 21. The transmission channel selection unit 21 may be arranged to select a transmission channel from the two or more data channels 41-45. Data may then be transmitted by the transmitter unit 2 to the receiver unit 3 via the selected transmission channel.

Figure 4:
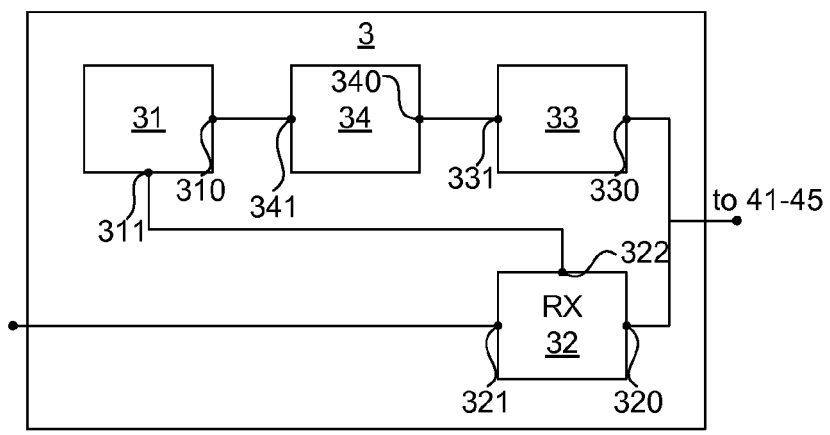
FIG. 4 shows a block diagram of an example of an embodiment of a transmitter unit.

As shown in FIG. 4 in more detail, the receiver unit 3 may include a receiver channel selection unit 31. The receiver channel selection unit 31 may select a reception channel from the data channels 41-45, independent from the channel selection performed by the transmission channel selection unit 21. Accordingly, the need for an exchange of channel control data between the receiver unit 3 and the transmitter unit 2, in order to set the receiver channel and/or the transmission channel, is obviated. Thereby, the risk of a failure in the communication between the receiver unit 3 and the transmitter unit 2 may be reduced, since the negative effect of channel control data not arriving at its destination, e.g. due to interference or noise in the respective communication channel, may be circumvented.

Furthermore, the receiver unit 3 can select a channel 41-45 without interrupting the operation of the transmitter unit. Thereby, the power consumption of the transmitter unit 2 and/or the receiver unit may, for instance, be reduced. For example, the transmitter unit 2 may have a low power consumption mode, for instance a sleep mode, and may be controlled to be in the low power consumption mode when not transmitting data. In such case, the transmitter unit 2 may remain in the low power consumption mode during the selection of the channel by the receiver unit 3 and accordingly power consumption may be reduced. The transmitter unit 2 may for example be connected to a power supply with a limited amount of energy, for example a battery. For instance, the transmitter unit 2 may be part of a remote control for an electronic apparatus, such as a household appliances, an electric switch, a sensor system, or any other type of battery or mains powered device.

The transmitter unit 2 may be implemented in any manner suitable for the specific implementation.

Referring to the example of FIG. 2, for instance, the transmitter unit 2 may include a transmitter 23. The transmitter 23 may have transmitter parameters which can be controlled by the transmission channel selection unit 21. The transmission channel selection unit 21 may for example set the transmitter parameters to correspond to the parameters of the selected transmission channel. The transmission channel selection unit 21 may for example set the parameters of the transmitter 23 such that the transmitter 23 transmits the data via the selected channel. For instance, the transmission channel selection unit 21 may control the frequency at which the transmitter 23 transmits the data and/or the modulation scheme used by the transmitter 23 and/or any other parameter suitable to select a data channel. As shown in the example of FIG. 2, the transmission channel selection unit 21 may for example be connected with a control output 210 to a control input 232 of the transmitter (TR) 23. The transmitter 23 may transmit the data via the selected channel, for example by outputting at a transmitter output 230 signals with the characteristics, e.g. the frequency, modulation scheme or otherwise, corresponding to the selected channel.

The transmission channel selection unit 21 may select the transmission channel in any suitable manner. The transmission channel selection unit 21 may for example be arranged to select initially a default transmission channel or to use one or more selection criteria to select the transmission channel. For instance, the transmission channel selection unit 21 may include a noise detector and select the transmission channel with the lowest amount of noise or select the transmission using one or more other suitable selection criteria.

After a transmission channel has been selected, the transmission channel selection unit 21 may select a next transmission channel, for example when the current transmission channel is not suitable to transmit data anymore, e.g. in case an interfering source has started interfering at the current transmission channel. The transmission channel may then, for example select, as the next transmission channel, a data channel which is positioned adjacent to the current transmission channel. For instance, when the data channels 41-45 have different frequencies, the transmission channel selection unit 21 may for example increment or decrement the frequency of the data channel to which the transmitter 23 is tuned with the amount corresponding to the difference in frequency between the frequency of the current channel and the frequency of an adjacent data channel.

In a data communication network compliant or compatible with the IEEE 802.15.4 standard, for example, the channels have different frequencies. In this respect, it should be noted that a frequency channels are is commonly identified by their center frequency, but a channel may actually be a frequency band including the center frequency, and may for example be a frequency band centered around the center frequency of the respective channel, for example with a width of 5 MHz. In a data communication network compliant or compatible with the IEEE 802.15.4 standard, sixteen channels are available in the 2450 MHz band, ten in the 915 MHz band, and one in the 868 MHz band. Thus, in case the data communication network is compliant or compatible with the IEEE 802.15.4 standard and operating in the 2.4 GHz frequency band, the transmission channel selection unit 21 may for instance increase or decrease the frequency with the amount required to set the transmitter 23 to an adjacent channel in the 2.4 GHz frequency band.

The transmission channel selection unit 21 may select the transmission channel at any suitable moment. For example, the transmission channel selection unit 21 may select a transmission channel when the transmitter unit 2 enters a transmitting mode (for example from a sleep mode or from an off-state). The transmission channel selection unit 21 may for example select, upon entering the transmitting mode, a default transmission channel.

The transmission channel selection unit 21 may also or alternatively be arranged to, for example, select another data channel than the current transmission channel when the transmitted data has not been received by the receiver unit 3. Thereby, the reliability of the communication may be increased. For instance, the transmission channel selected by the transmitter unit 2 may be different from the channel selected by the receiver unit 3 as the receiving channel. Accordingly, data transmitted by the transmitter unit 2 may be missed by the receiver unit 3, since the receiver unit 3 is configured to receive data via a different other channel and will either not receive the data or not recognise the transmitted data in the received signals.

The transmitter unit 2 may determine the reception of the data by the receiver unit 3 in any suitable manner. As shown in the example of FIG. 2, the transmitter unit 2 may for instance include a reception detector 22. The reception detector 22 may detect whether transmitted data has been received by the receiver unit 3. For instance, the reception detector 22 may be arranged to detect reception by the transmitter unit 2 of a receipt signal transmitted by the receiver unit 3 in response to receiving the data by the receiver unit 3. As shown in FIG. 2 the reception detector 22 may, for instance, be connected to a control channel 46 via which the receiver unit 3 can transmit communication control data to the transmitter unit 2. The control channel 46 may for example be the same channel as the transmission channel and/or the receiving channel or be a different, e.g. dedicated, control channel. As shown in the example of FIG. 2, for instance, the reception detector 22 may be connected with a detector input 221 to the control channel 46, in order to receive and/or transmit communication data from and/or to the receiver unit 3.

The reception detector 22 may detect the reception in any suitable manner. The reception detector 22 may for example be connected to the control channel 46 to monitor whether or not acknowledge data (ACK) has been received by the transmitting unit 2. The receiver unit 3 for example may be constructed to transmit receipt acknowledge data (ACK) to the transmitter unit 2 via the control channel 46 in response to the reception of data by the receiver unit 3. The reception detector 22 may then determine that the transmitted data has not been received by the receiver unit 3 in case the acknowledge data ACK has not been received in within a certain period of time.

For instance, the reception detector 22 may be connected to a timer 24 which is activated when the transmitter unit 2 transmits data to the receiver unit 3, via the transmission channel, and stopped when the acknowledge data (ACK) is received. In the example of FIG. 2, for instance, the reception detector 22 is connected with a timer input 220 to a timer output 40 of a timer 24, the reception detector may determine the state of the timer 24 via the timer input 220 and compare the state of the timer 24 with a criterion suitable to determine whether or not the data has been received by the receiver unit 3. The reception detector 22 may for example control the transmission channel selection unit 21 to select another transmission channel in case the time indicated by the timer 24 exceeds a predetermined time-out value, e.g. in case the acknowledge data (ACK) has not been received within the period of time corresponding to the time-out value.

Suitable values for the time-out value have found to be in the range of less than 5 ms, such as less than 2 ms. For example, in a data communication network compliant with the IEEE 802.15.4 standard, a good reliability has been found for time-out values lower than 2 ms and/or higher than 0.5 ms, such as in the range from 0.8 ms to 2 ms, for example from 864 µs to 1920 µs. The time-out value may for example be dependent on the selected transmission channel. For instance, the time-out value may be between 0.5 ms and 1 ms, such as in the range from 0.7 up to and including 1 ms, such as 864 µs for example, for a channel in the 2.4 GHz band. The time-out value may for example be in the range between 1 ms and 2 ms, such as in the range from 1.5 up to and including 2 ms, such as 1920 µs for example, for a channel in the 800 MHz band.

The reception detector 22 may initiate one or more operations when the detector 22 determines that the data has not been received by the receiver unit 3. For example, as shown in FIG. 2, the reception detector 22 may be connected with a control output 223 to a control input 211 of the transmission channel selection unit 21. The reception detector 22 may output a selection control signal to the transmission channel selection unit 21, via the control output 223 and the control input 211. In response to the selection control signal, the transmission channel selection unit 21 may select another data channel 41-45 as the transmission channel.

The reception detector 22 may initiate, in addition to the transmission channel selection, other operations when the transmitted data has not been received by the receiver unit 3. For instance, the reception detector 22 may be connected to the transmitter 23 and control the operation of the transmitter 23. As shown in FIG. 2, for example, an detector output 222 of the reception detector 22 may be connected to a control input 231 of the transmitter 23. The reception detector 22 may control transmitter 23 via the control input 231 to resend the transmitted data. The transmitter 23 may for example include a (not shown) buffer in which a copy of the transmitted data is stored and resend the transmitted data in the buffer in response to the resend signal.

For instance, the reception detector 22 may control the transmitter 23 to retransmit the transmitted data via the current transmission channel in case the ACK is not received, e.g. within the time-out period. The reception detector 22 may for example control the transmitter 23 to repeat the retransmission in case the ACK is not received, e.g. within the time-out period. The reception detector 22 may for example limit the number of retransmissions via the current transmission channel to a predetermined maximum number of times, for example ten or less transmissions, for instance five or less, such as three or less retransmissions. The reception detector 22 may also or alternatively control the transmitter 23 to retransmit the transmitted data via the next transmission channel in case the ACK is not received via the current transmission channel, e.g. within the time-out period and/or after the maximum number of retransmissions. The detector 22 may for example transmit a resend signal to the transmitter 23, via the connection.

Furthermore, the reception detector 22 may reset the timer 24 and reactivate the timer 24 when the transmitter 23 resends the transmitter data via the next transmission channel. In case the reception detector 22 does not receive the acknowledge data (ACK) within the time-out period after resending the transmitted data, the reception detector 22 may initiate another reselection of the transmission channel by the transmission channel selection unit 21.

The transmitter unit 2 may transmit any type of data suitable for the specific kind of network. The data may for example include data generated by the transmitter unit 2, for instance to set up a communication between the transmitter unit 2 and the receiver unit 3. The transmitter unit generated data may for example include channel control data which may be used to set up a communication between the transmitter unit 2 and the receiver unit 3, such as the network address of the transmitter unit 2, data regarding the type of transmitter unit 2 or other suitable data.

However, it is also possible that the transmitter unit 2 receives at an input 20 data from another data generating device and transmits the data to the receiver unit 3 via the transmission channel. The data generating device may for example include: a remote control and/or a monitoring device and/or a sensor device and/or a home appliance and/or any other suitable data generating device. As shown in the example of FIG. 2, for instance, the transmitter 23 may have a data input 233 which is connectable to a data generating device. The transmitter 23 may receive at the data input 233 data and process the data in order to be suitable to be transmitted via the transmission channel. The transmitter 23 may for example generate data packets from the received data and/or code the received data and/or multiplex the received data and/or modulate the received data and/or perform any other suitable operation on the data.

The transmitter unit 2 may transmit the data in any suitable manner. The transmitter unit 2 may for example operate as a continuous transmitter, an intermittent transmitter, a periodic transmitter or a repetitive transmitter.

In case the transmitter unit 2 operates as an intermittent transmitter of data, that is transmits data during a transmitting period of time and then not transmit data during a silent period of time (of variable length), the transmitting period may for example be 5 ms or less and/or more at least 0.2 ms. The silent period may for example be in the range of 1 ms to a number of days, depending on the specific application. The transmitter may for example transmit remote control data to a receiver unit which can control the operation of an apparatus, such as for example remote control data for a television, a stereo, a light switch or other suitable device or apparatus.

In case the transmitter unit 2 is a periodic transmitter, that is transmits a variable amount of data at periodic points in time, the intervals between transmissions may for example be in the range of 5 ms to a number of days depending on the specific application. In such case, the transmitter unit 2 may for example transmit data from a wireless sensor or meter. The transmitter unit 2 may for example be switched into an active mode and transmit the data and be switched into a sleep mode after the data has been transmitted and be switched into the active mode a following time the sensor or meter wants to send data.

In case the transmitter unit 2 is a repetitive transmitter, that is transmits the same amount of data at periodic points in time, the intervals between transmissions may for example be in the range of 5 ms to a number of days, depending on the specific application. For example, the transmitter unit 2 may have been allocated a time-slot to transmit the data, thereby ensuring that the transmitter unit 2 can indeed transmit the data. The repetitive transmission may for example be used to transmit data from a sensor in a security system to a monitoring unit.

Figure 3:
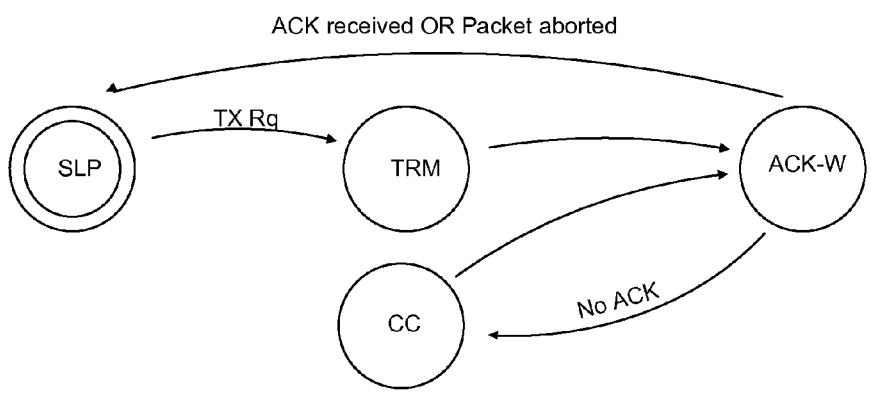
FIG. 3 shows an example of a state diagram for the example shown in FIG. 2.

The transmitter unit 2 may for example be implemented to perform a process as illustrated in FIG. 3. As shown in FIG. 3, the transmitter unit 2 may for example be in a sleep state 'slp' and receive a data transmit request 'TX Rq'. In response to the request, the transmitter unit 2 may wake up and transmit the data in a transmit state 'TRM'. After transmitting the data, the transmitter unit 2 may change from the transmit state into a waiting state during which the transmitter unit 2 waits to receive a confirmation of reception by the receiver unit 3, as is indicated in FIG. 3 with 'ACK-W'. When the transmitter unit 2 has been in the waiting state during a period of time which exceeds a threshold value, the transmitter unit 2 is switch into a channel selection state 'CC' in which another transmission channel is selected. From the channel selection state 'CC', the transmitter unit 2 may return into the waiting state 'ACK-W' but using another channel, i.e. the new transmission channel, for the receipt acknowledgement. When in the waiting state 'ACK-W', the confirmation of the reception is received or the transmission is aborted, the transmitter unit 2 returns into the sleep state.

The receiver unit 3 may be implemented in any manner suitable for the specific implementation. Referring to the example of FIG. 4, the receiver unit 3 may include a receiver channel selection unit 31. The receiver channel selection unit 31 may be connected to a receiver (RX) 32. In the example of FIG. 4, for instance, the receiving channel selection unit 31 is connected with a control output 311 to a control input 322 of the receiver (TR) 32. The receiving channel selection unit 31 can control the receiver 32 to receive data via the selected channel. For instance, the receiving channel selection unit 31 may control the frequency at which the receiver 32 receives the data, the demodulation scheme used by the receiver 32 or any other parameter suitable to select a data channel. The receiver 32 may then receive, at an input 320, the data at the selected channel. The receiver 32 may, for example, process the received data, for instance to set up a communication between the transmitter unit 2 and the receiver unit 3. However, it is also possible that the receiver unit 2 outputs the received data via an output 321 to a (not shown) data processing device.

The receiver channel selection unit 31 may select the receiving channel at any suitable moment. The receiver channel selection unit 31 may for example select the receiving channel when the receiving unit 3 enters a receiving mode. However, the receiver channel selection unit 31 may alternatively or in addition select the receiving channel when the receiving unit 3 is already in the receiving mode.

The receiver channel selection unit 31 may select the receiving channel in any manner suitable for the specific implementation. The receiver channel selection unit 31 may for example, as shown, include an interference detector 33. The interference detector 33 may detect interference in the selected receiver channel. For instance, in case the data channels 41-45 have different frequencies, the interference detector 33 may be arranged to detect the noise level in the frequency band corresponding to the selected receiver channel.

The interference detector 33 may as shown in the example of FIG. 4, for instance, be connected with an input 330 to the selected receiver channel. As shown in FIG. 4, the interference detector 33 may for example be connected to the other data channels 41-45 as well.

The interference detector 33 may be arranged to detect an amount of energy in the signals presented at the input 330, and hence in the selected receiver channel. The interference detector 33 may for instance detect an amount of energy received, from the receiver channel, at the input 330. The interference detector may for example be configured to determine the amount of energy not contributed to data originating from the transmitter unit 2. For example in case the data channels differ in frequency, the interference detector 33 may detect the interference in the frequency band corresponding to the selected receiving channel.

The interference detector 33 may for example initiate a reselection in case the amount of energy exceeds an interference threshold. As shown in FIG. 4, the interference detector 33 may for example be connected to a selection unit controller 34. As shown in the example of FIG. 4, for instance, an output 331 of the interference detector 33 may be connected to an input 340 of the selection unit controller 34.

The selection unit 34 may control the receiver channel selection unit 31 to select another channel than a current receiver channel in case the interference detected by the interference detector 33 satisfies a predetermined criterion, for instance in case the interference detector 33 detects an amount of interference in the current receiver channel which exceeds a predetermined threshold value. The interference detector 33 may output a reselection signal to the selection unit controller 34 in case the determined energy exceeds an interference threshold.

The interference detector 33 may for example take energy samples (that is determine the energy level in a channel such as e.g. the current receiver channel) at different points in time, for example separated by time intervals, for example of 1 ms. The energy samples may then be then processed to see if a data transmission process could take place considering the level of interferences found on the channel. In particular, the interference detector 33 may determine if a "free window" can be found, that is a number of consecutive low energy level samples giving sufficient indication that a data transmission is possible to be performed in the present conditions and the channel (frequency) maintained for the receiving process. For instance, the free window may be found in case for example from a set of energy samples, such as 15 samples, at least a number exceeding a predetermined lower limit, e.g. at least 5, consecutive energy samples are showing no activity on the current channel. If the interference detector 33 does not find such a window, the interference detector may output the reselection signal, in order to initiated the selection of a new receiving channel.

The selection unit controller 34 may initiate, in response to the reselection signal, a reselection of the receiving channel by the receiving channel selection unit 31. For instance, the selection unit controller 34 may be connected with an output 341 to a control input 310 of the receiving channel selection unit 31. The controller 34 may control via the output 341 the operation of the receiving channel selection unit 31 and make the receiving channel selection unit 31 perform the receiving channel selection when the reselection signal is outputted by the interference detector 33.

Figure 5:
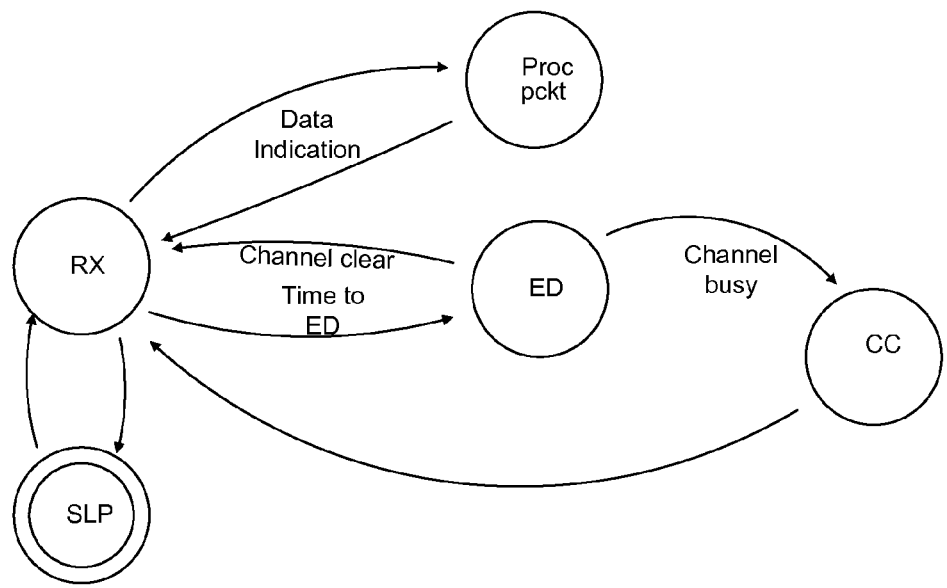
FIG. 5 shows an example of a state diagram for the example shown in FIG. 4.

The receiver unit 3 may for example be implemented to perform a process as illustrated in FIG. 3. As shown in FIG. 5, the receiver unit 3 may, for example initially be in a sleeping state SLP and enter a receiving state Rx. In the receiving state, the receiver unit 3 may receive an indication that data will be received, e.g. receive handshake data from a transmitting unit 2 and enter in a data processing state 'Proc Pckt'. The receiver unit 3 may from the receiving state 'Rx' enter into an energy detection state 'ED' in which the energy caused by interfering signals in the receiving channel is determined. In case the interference is below a threshold value, the receiving channel may be determined to be clear from seriously disturbing interference and the receiver unit 3 may re-enter the receiving state. In case the energy exceed the threshold value, the receiving channel may be determined to be occupied by another source of signals, e.g. another transmitting unit or a source of noise. The receiver unit may then enter a change channel state 'CC' in which another receiving channel is selected. In case the data channels 41-45 differ in frequency, the other receiving channel may for example be selected by incrementing or decrementing a frequency to which the receiver unit 3 is tuned, to the frequency of an adjacent channel. The other receiving channel may also be selected in a different manner. For example, the interference in one or more of the other data channels may be determined and compared with a suitable criterion, e.g. the interference energy may be compared with a threshold. A data channel with an amount of interference satisfying the criterion may then be selected. For instance, the data channel with the lowest amount of interference energy may be selected as the receiving channel. Once a receiving channel is selected, the receiver unit 3 may re-enter the receiving stat 'RX'.

Figure 6:
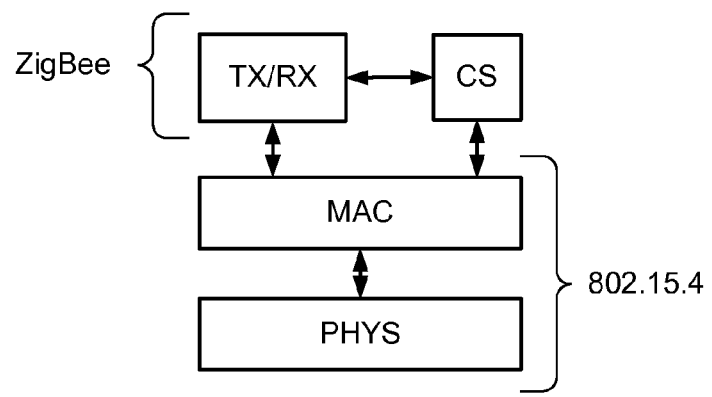
FIG. 6 schematically illustrates an example of an embodiment of a layered system.

Referring to FIG. 6, an example is shown of an implementation of the transmitting unit 2 and/or receiver unit 3 in a system implemented according to a layered model. The model may for example be a layered model compliant or compatible with a communications standard, such as the IEEE 802.15.4 standard or the ZigBee standard. As shown in FIG. 6, the unit 2,3 may include a physical layer and a Media Access Control (MAC) layer which can communicate with each other. The a physical layer and a Media Access Control (MAC) layer may for example be implemented are defined in the IEEE 802.15.4 standard. The unit 2,3 may further have a transmitter or receiver layer TX/RX. As indicated in FIG. 6 layer TX/RX may for example be compliant or compatible with the ZigBee standard. The transmitter or receiver layer TX/RX may, as indicated with the arrow in FIG. 6 communicate with the MAC layer. The unit 2,3 may further include a channel selection layer CS which can perform the channel selection functions. As shown with the arrows, the channel selection layer CS may communicate with the TX/RX layer and the MAC layer.

The TX layer may for example perform the function of a data packet generation unit compliant with the IEEE 802.15.4 standard. The TX layer may pass generated data packets to lower layers, e.g. the MAC layer and the physical layer, which will handle the physical transmission of the data packets. The TX layer may supervise the transmission process by waiting for the receive confirmation from the destination (remote) node and restart the data transmission process on another frequency band (transmission channel) chosen by the channel selection layer CS. The new transmission channel may be selected by the channel selection layer CS by following a certain pattern through the predefined channel list, including direct ascending or descending order. The TX layer may end the started transmission process after the destination node has acknowledged the data reception or when the retry has been performed several times on all the channels predefined in the channel selection layer CS.

The RX layer may for example handle the data reception process for all packets received and passed from the lower layers, e.g. the MAC layer and the physical layer. Also the RX layer may check the occupancy of the current receiving channel through recurrent energy detection and select a new receiving channel if the interferences found on the current channel are to high for a safe data transmission process.

The transmitter unit 2 and/or receiver unit 3 may form part of any suitable electronic apparatus or device. For example, the transmitter unit 2 may form part of a device which controls the operation of the apparatus into which the receiver unit 3 is implemented, e.g. a remote control. The remote control may for example control a household appliance, an electric or electronic devices, such as for instance a television, a radio, a music player, a personal computer, an air-conditioning system, a security system, a light switches, or any other suitable device, apparatus or system.

Figure 7:
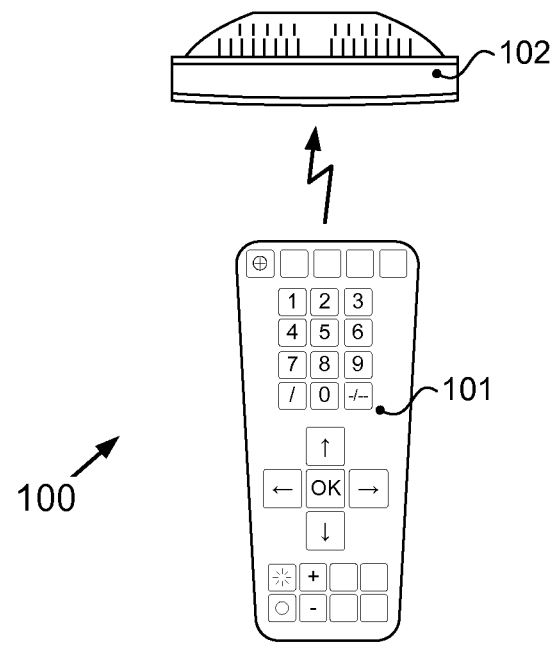
FIG. 7 schematically illustrates an example of an embodiment of a control and/or monitoring system.

Referring to FIG. 7, by way of an example, a television system 100 is shown. The television system 100 may include a remote control 101 and a television 102. The remote control 101 may include a transmitter unit 2 and the television may include a receiver unit 3. The remote control 101 may transmit via the transmitter unit 2 television control data, for example generated by a user pressing buttons on the remote control or other suitable type of input by a user via a user-interface. The receiver unit 3 may receive television control data and output the received televisions control data to a television controller which operates the television 102 accordingly. The television controller may for example set the television channel, the volume of the audio outputted by the television 102, the brightness of the television screen or other suitable parameter of the television in accordance with control instructions in the television control data.

The invention may be implemented as a kit. The kit may for example be provided as a set of separate components which can be connected to each other to assemble a module operating as a transmitter unit 2 or a receiver unit 3 or may be provided as an assembled module of components connected to each other in a manner suitable for operate as the transmitter unit 2 or the receiver unit 3.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the network may for example a wireless personal area network, a home area network or other suitable type of network. The transmitting unit 2 may for example have a range between 0 and 100 meters.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the transmitter unit may be implemented as a number of separate integrated circuits.

Also, devices functionally forming separate devices may be integrated in a single physical device. For example, the transmitter 23 and the transmission channel selection unit 21 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A transmitter unit for transmitting data in a data communication network, the data communication network including a receiver unit for receiving data from said transmitter unit and at least two data channels which data may be transmitted by said transmitter unit to said receiver unit, the transmitter unit comprising:
    a transmission channel selection unit, wherein said receiver unit selects a single reception channel from said at least two data channels independent from a selection of an initial transmission channel by said transmission channel selection unit, said transmission channel selection unit is arranged to select, prior to reception of any transmission from the receiver unit, the initial transmission channel from said at least two data channels to transmit data.

2. A transmitter unit as claimed in claim 1 further comprising:
    a reception detector for detecting whether transmitted data has been received by said receiver unit; and
    wherein said transmission channel selection unit is arranged to select another data channel than said initial transmission channel when said reception detector detects that said transmitted data has not been received by the receiver unit in response to acknowledge data not being received within a period of time corresponding to a time-out value.

3. A transmitter unit as claimed in claim 2, wherein said reception detector is arranged to detect a receipt signal transmitted by said receiver unit to said transmitter unit.

4. A transmitter unit as claimed in claim 1, wherein said at least two channels are wireless communication channels.

5. A transmitter unit as claimed in claim 1, wherein said transmitter unit is an intermittent transmitter.

6. A transmitter unit as claimed in claim 1, wherein said network system is a wireless personal area network.

7. A transmitter unit as claimed in claim 1, wherein said transmitter unit forms part of a remote control.

8. A transmitter unit as claimed in claim 1, wherein said transmitter unit forms part of a sensor.

9. A method for transmitting data, comprising:
    selecting, at a receiving side, prior to a selection of a single initial transmission channel at a transmitting side, a single reception channel from at least two data channels;
    selecting, at the transmitting side, the single initial transmission channel from said at least two data channels prior to receiving any transmission from the receiving side;
    enabling said single reception channel at said receiving side for reception of data; and
    transmitting at the transmitting side said data via said single initial transmission channel.

10. A receiver unit for a data communication network, the network including a transmitter unit, wherein data is transmitted by said transmitter to said receiver unit by one of at least two data channels, the receiver unit comprising:
    a receiver channel selection unit for selecting a single reception channel from said at least two data channels, said receiver channel selection unit to select the single reception channel prior to a selection of a single initial transmission channel by said transmitter unit, said transmitter unit selects the single initial transmission channel prior to receiving any transmission from the receiver unit, independent of the selection of the single reception channel, from said at least two data channels to transmit data.

11. A receiver unit as claimed in claim 10 comprising:
    an interference detector for detecting interference in said selected receiver channel; and
    a selection unit controller for controlling said receiver channel selection unit to select another channel than a current receiver channel in case interference satisfying a predetermined criterion is detected.

12. A receiver unit as claimed in claim 11 wherein said interference detector is constructed to detect an amount of energy in said selected receiver channel.

13. A receiver unit as claimed in claim 10, wherein said receiver unit forms part of a household appliance.

14. A receiver unit as claimed in claim 10 wherein said at least two channels are wireless communication channels.

15. A receiver unit as claimed in claim 10, wherein said receiver unit forms part of a radio.

16. A receiver unit as claimed in claim 10, wherein said receiver unit forms part of a music player.

17. A receiver unit as claimed in claim 10, wherein said receiver unit forms part of a personal computer.

18. A receiver unit as claimed in claim 10, wherein said receiver unit forms part of an air-conditioning system.

19. A receiver unit as claimed in claim 10, wherein said receiver unit forms part of a security system.

20. A receiver unit as claimed in claim 10, wherein said receiver unit forms part of a light switch.

* * * * *